United States Patent [19]

Cedar

[11] Patent Number: 4,923,216
[45] Date of Patent: May 8, 1990

[54] LONGITUDINALLY REINFORCED CRIMPED STREAMER

[76] Inventor: Joseph Cedar, 3950 Via Real, #63, Carpinteria, Calif. 93013

[21] Appl. No.: 215,349

[22] Filed: Jul. 5, 1988

[51] Int. Cl.$^5$ .................... B42D 21/04; B21D 13/10; B21D 13/00
[52] U.S. Cl. .................................. 281/2; 72/196; 428/603
[58] Field of Search .............. 281/2; 229/56, 90; 264/168; 362/297; 57/282; 425/303, 325, 396; 428/179, 603; 53/370; 138/173; 162/111; 72/190, 196

[56] References Cited

U.S. PATENT DOCUMENTS

| | | | |
|---|---|---|---|
| 296,705 | 4/1884 | Novy et al. | 229/90 |
| 950,785 | 3/1910 | Peme | 229/90 |
| 1,517,633 | 12/1924 | Junkers | 428/603 |
| 2,107,677 | 2/1938 | Sexton . | |
| 2,117,501 | 5/1938 | Raymond . | |
| 2,414,378 | 1/1947 | Kelman . | |
| 2,688,303 | 9/1954 | Leander . | |
| 2,703,771 | 3/1955 | Boulware . | |
| 2,769,479 | 11/1956 | Getz | 72/196 |
| 2,943,965 | 7/1960 | Stogre . | |
| 3,273,976 | 9/1966 | Wogerbauer | 428/603 |
| 3,894,225 | 7/1975 | Chao . | |
| 3,974,324 | 8/1976 | Lupinski . | |
| 4,184,002 | 1/1980 | Reiniche et al. | 428/603 |
| 4,199,627 | 4/1980 | Weder . | |
| 4,385,087 | 5/1983 | Roberts et al. | 425/303 |
| 4,427,354 | 1/1984 | Roberts et al. | 425/303 |
| 4,528,230 | 7/1985 | Larson . | |
| 4,626,459 | 12/1986 | Warhol . | |
| 4,748,838 | 6/1988 | Cornelison | 72/196 |

FOREIGN PATENT DOCUMENTS

| | | |
|---|---|---|
| 24585 | 1/1963 | Fed. Rep. of Germany . |
| 269205 | 10/1950 | Switzerland . |

Primary Examiner—Douglas D. Watts
Assistant Examiner—Paul M. Heyrana
Attorney, Agent, or Firm—Marvin E. Jacobs

[57] ABSTRACT

A longitudinally reinforced crimped streamer includes a thin narrow metallic strip of flexible streamer material having a pair of opposite faces and a multiplicity of longitudinally-spaced, transversely-extending crimps set therein. The crimps form a series of alternating, opposite-facing, permanent, flexible bends in the streamer material and provide a multiplicity of transversely-extending opposing pairs of surfaces with the surfaces of one pair being disposed in inclined relation to the surfaces of each adjacent pair. The streamer also includes at least one elongated strip of flexible reinforcing material much narrower in width than the strip of streamer material and adhesively applied to adjacent surfaces provided on one face of the streamer material strip and extending longitudinally therealong, generally perpendicular to the extent of the crimps and centered between opposite side edges of the streamer material strip. The reinforcing material strip can be in the form of ordinary flexible strapping tape.

21 Claims, 2 Drawing Sheets

LONGITUDINALLY REINFORCED CRIMPED STREAMER

DESCRIPTION

1. Technical Field

The present invention relates generally to decorative strips and, more particularly, is concerned with an elongated longitudinally reinforced crimped streamer.

2. Statement of the Prior Art

Decorative strips such as crimped streamers are commonly employed to attract public attention to events such as business opening celebrations, government and commercial facility dedications and to many other occasions such as retail sales promotions.

Typically, the streamers can vary from a few to many feet in length and are anchored either at one or both opposite ends. The streamers are ordinarily composed of a thin flat narrow band or strip of metallic material, such as aluminum, colored on one or both opposite faces, or other materials such as metalized strips of plastic films. The flat strips have longitudinally or axially spaced transverse crimps permanently set in the material so as to form a series of alternating, opposite-facing, permanent bends therein. These crimps provide a row or series of transversely-extending, opposing pairs of surfaces with the surfaces of each pair being disposed in inclined relation to adjacent surfaces. In normal light conditions, a crimped streamer such as described will reflect light in a dancing, dazzling fashion guaranteed to capture the attention of persons in the area.

However, at many of these events and occasions, the streamers are used outside where they are subject to deleterious effects of wind conditions. Wind can constantly flex and twist the streamers. The crimps define many axially spaced apart bend lines at any number of which wind-induced flexing of the streamer can occur. Also, wind-induced twisting of the streamer into a spiral configuration tends to cause its crimps or bends to flatten out and thus the streamer to eventually lose its corrugated or undulating configuration.

Consequently, a need exists for improvements in the construction of crimped streamers which will make them better able to withstand wind conditions and thereby reduce or eliminate the above-mentioned deleterious effects.

SUMMARY OF THE INVENTION

The present invention provides a longitudinally reinforced crimped streamer designed to satisfy the aforementioned needs. The crimped streamer is reinforced by at least one strip of tape much narrower in width than the streamer. Alternatively, two or more strips of tape can be used. The reinforcing strip of tape is applied to one face of the streamer longitudinally or axially therealong and, preferably, centered between opposite side edges of the streamer. The reinforcing strip of tape prevents tearing of the streamer and reduces stress cracks caused by fatigue primarily due to wind conditions. Even if the streamer should fatigue and break at one of the crimp bend lines or elsewhere, the reinforcing tape will hold the streamer together at the location of the break. Further, the strip of tape tends to retain the undulating configuration of the streamer even as the streamer is continuously twisted by wind conditions.

Accordingly, the present invention is directed to a longitudinally reinforced crimped streamer which comprises: (a) a thin narrow strip of flexible streamer material having a pair of opposite faces and a multiplicity of longitudinally-spaced, transversely-extending crimps set permanently therein; and (b) at least one elongated strip of flexible reinforcing material much narrower in width than the strip of streamer material and adhesively applied to one face thereof and extending longitudinally therealong. The reinforcing strip is preferably applied along the streamer material strip generally perpendicular to the longitudinal extent of the transverse crimps therein and centered between opposite side edges thereof.

The crimps in the streamer material strip form a series of alternating, opposite-facing, permanent bends therein and provide a multiplicity of transversely-extending opposing pairs of surfaces with the surfaces of one pair being disposed in inclined relation to the surfaces of each adjacent pair. The reinforcing material strip is applied to the streamer material strip so as to conform to the configuration of the bends therein and adhere to the adjacent surfaces on the one face thereof.

More particularly, the strip of streamer material is composed of a thin flat narrow band or strip of metallic material, such as aluminum, colored on one or both opposite faces, or other materials such as metallized strip of plastic film. The material of the reinforcing strip preferably is reinforced strapping tape. However, other ordinary commercial tapes, such as transparent mending tape or opaque adhesive tapes, can be used.

Alternatively, a pair of the reinforcing material strips can be applied to the one face of the streamer material strip in longitudinally extending, spaced apart side-by-side relation to one another.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
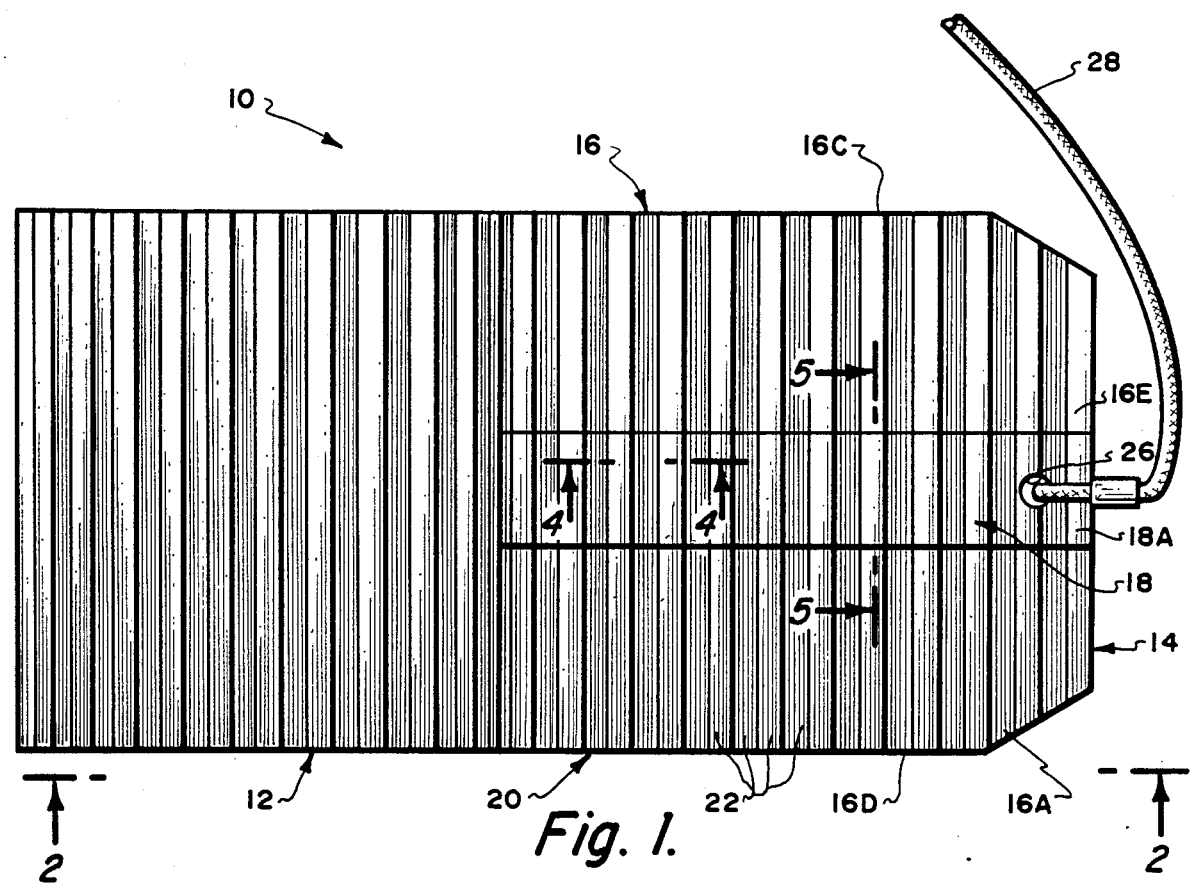
FIG. 1 is a top plan view of a roll of reinforced crimped streamer constructed in accordance with the principles of the present invention, with an end portion of the streamer being unrolled to illustrate a reinforcing strip adhered to one face of the streamer.
Figure 2:
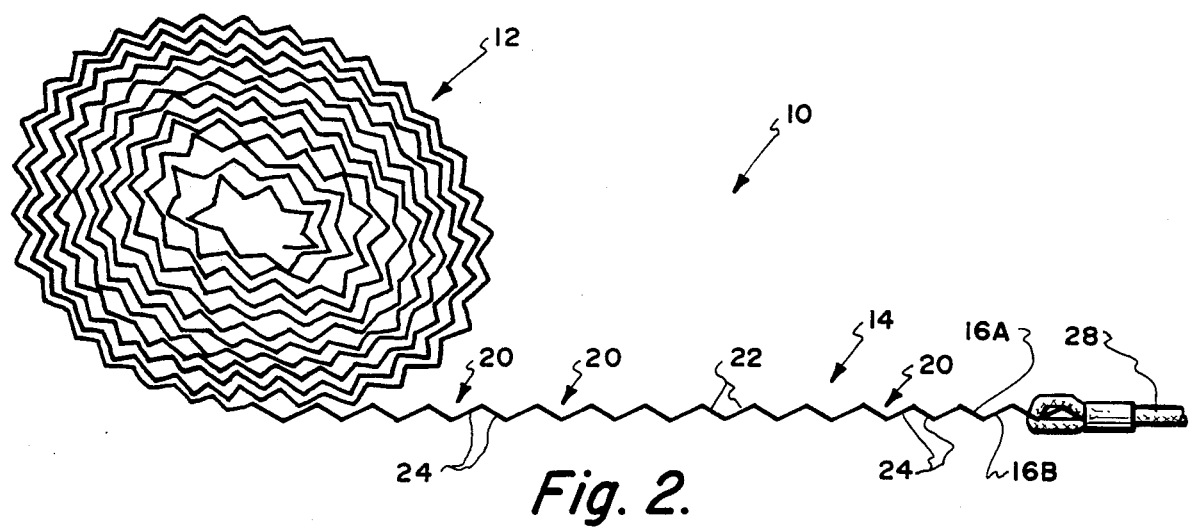
FIG. 2 is a side elevational view of the streamer roll and unrolled end portion as seen along line 2—2 of FIG. 1.
Figure 4:
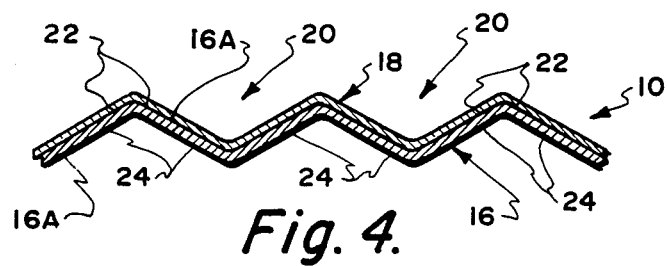
FIG. 4 is an enlarged longitudinal sectional view of a fragmentary portion of the reinforced streamer taken along line 4—4 of FIG. 1.
Figure 3:
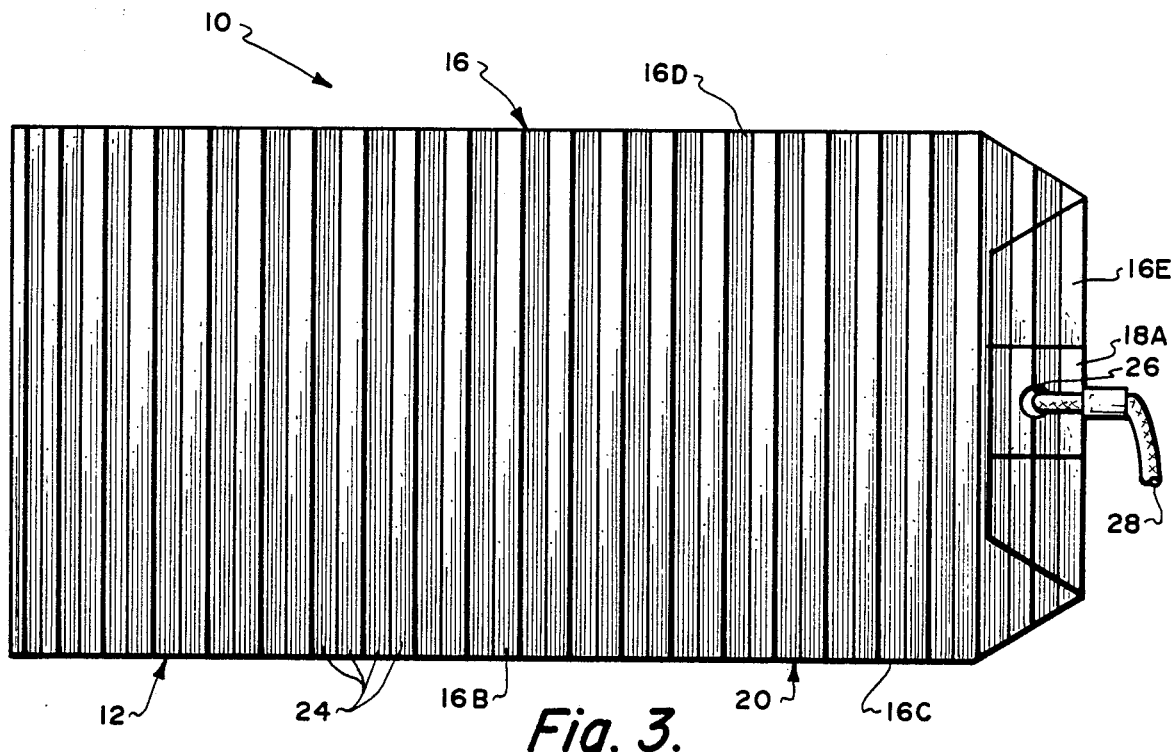
FIG. 3 is a bottom plan view of the streamer roll and unrolled end portion of FIG. 1.
Figure 5:
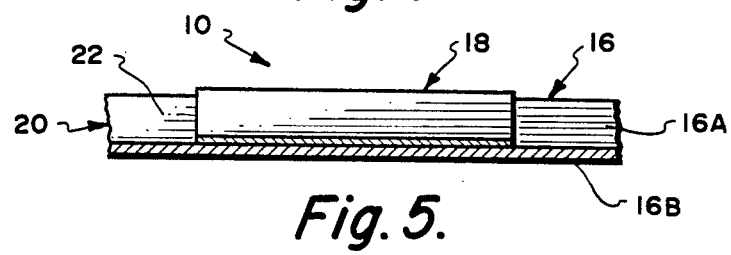
FIG. 5 is an enlarged cross-sectional view of a fragmentary portion of the reinforced streamer taken along line 5—5 of FIG. 1.

Referring now to the drawings, and particularly to FIGS. 1-3, there is shown one embodiment of a longitudinally reinforced crimped streamer, being indicated generally by the numeral 10 and constructed in accordance with the principles of the present invention. A roll 12 of the streamer 10 is illustrated with an end portion 14 thereof being unrolled from the roll 12. The reinforced streamer 10 basically is composed of a thin narrow flexible strip 16 of streamer material and an elongated flexible strip 18 of reinforcing material.

More particularly, the streamer material strip 16 of the reinforced streamer 10 has a pair of opposite faces 16A, 16B and a multiplicity of longitudinally-spaced, transversely-extending crimps 20 permanently set therein. The crimps 20 are in the form of a series of alternating, opposite-facing, permanent bends therein which provide a multiplicity of transversely-extending opposing pairs of surfaces 22, 24 with the surfaces of one pair being disposed in inclined relation to the surfaces of each adjacent pair.

In the one embodiment of FIGS. 1-6, the reinforced streamer 10 also includes the one elongated reinforcing material strip 18 which, preferably, is much narrower in width than the streamer material strip 16. The reinforcing strip 18 is adhesively applied to the one face 16A of the streamer strip 16 and extends longitudinally therealong. Preferably, the reinforcing strip 18 is applied generally perpendicular to the transversely-extending crimps 20 in the streamer strip 16 and centered between and with respect to opposite side edges 16C, 16D thereof. By way of example, the crimps 20 are permanently formed in the streamer material strip 16 concurrently with application of the adhesively-backed reinforcing material strip 18 thereon by passing the streamer and reinforcing strips 16, 18 together between a pair of rolls (not shown) having intermeshing crimping teeth formed circumferentially thereon. When applied to the streamer strip 16, the reinforcing strip 18 adheres to the adjacent surfaces 22 of the crimps 20 on the one face 16A of the streamer strip 16 and conforms with the generally undulating configuration of the bends or crimps 20 permanently set in the material.

More particularly, the streamer strip 16 is composed of a thin flat narrow flexible band or strip of metallic material, such as aluminum, colored on one or both opposite faces. Alternatively, the strip 16 can be composed of other materials, such as metallized strips of different flexible plastic films. The material of the reinforcing strip 18 preferably is conventional fabric, paper or plastic reinforced flexible strapping tape. However, other ordinary commercial fabric, paper or plastic tapes, such as transparent mending tape or opaque adhesive tapes, can be used.

In FIGS. 1 and 3, it is seen that the end margins 16E, 18A of the adhered streamer and reinforcing strips 16, 18 of the streamer 10 are bent back on themselves and a hole 26 punched therethrough. A twistable string or cord 28 is inserted through the hole 26 and attached the double-backed strip end margins 16E, 18A. This can also be done at the opposite end of the streamer 10. The cord 28 can be used to anchor the streamer 10 to a post or the like. Also, a streamer which is hung vertically can have a weight attached to its bottom end.

Figure 6:
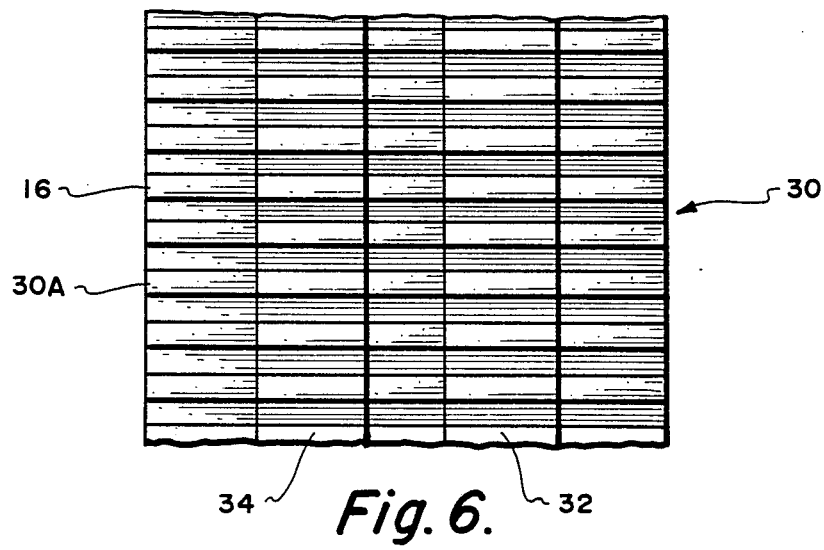
FIG. 6 is a top plan view of a fragmentary portion of an alternative embodiment of the reinforced streamer.

Turning to FIG. 6, there is illustrated an alernative embodiment of the streamer, generally designated by the numeral 30, which only differs from the streamer 10 by the number of reinforcing strips thereon. Instead of one center reinforcing strip 18, the streamer 30 has a pair of reinforcing material strips 32, 34 applied to the one face 30A of its streamer strip 16. The pair of reinforcing strips 32, 34 extend in longitudinal, spaced apart, side-by-side relation to one another. Other than that they adhere in the same manner to the streamer strip 16.

Preferably, the width of the reinforcing strip 18, 32 or 34 is less than one-fifth of the width of the streamer strip 16. For example, the reinforcing strip might be ½ inch wide on a streamer strip which is 3½ inches wide. The following are suggested dimensions of a streamer strip:

| Dimension | Range | Preferred | Example |
| --- | --- | --- | --- |
| Width of streamer strip | 1" to 5' | 2" to 6" | 3.5" |
| Thickness of Al of streamer strip | 1 to 5 mil | | 2 mil |
| Crimp angles | 60 to 140 degrees | | |
| Crimp sides or surfaces may be of unequal widths | ⅛" to ¼" for 3.5" width<br>1" to 1.5" for 3" width | | |
| Length of streamer strip | 6" to many feet - L:W ratio of at least 6:1 | | |

The preferred material is color anodized Al. The streamer strip can be silver-color, silver on both faces or can be color anodized on both faces with brigh colors such as red, green, blue, yellow, purple and the like. Streamers of different colors can be stapled together or adhered by adhesive.

In conclusion, it will be readily understood that the reinforcing tape or strip reinforces the streamer strip and prevents tearing thereof and reduces stress cracks caused by fatigue. Even if the streamer strip should fatigue an break, the reinforcing strip will hold the streamer together across the break.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A longitudinally-reinforced, crimped metal streamer, comprising:
   (a) a thin narrow streamer tape strip of flexible metal or metallized plastic streamer tape strip having a first end and a second end having a pair of opposite faces and a multiplicity of longitudinally-spaced, transversely-extending crimps set therein;
   (b) at least one elongated strip of said crimped, metal streamer tape strip being flexible and twistable longitudinally to form a spiral, flexible reinforcing tape strip much narrower in width than said strip of streamer tape strip and adhesively applied to one face thereof and extending longitudinally therealong between said ends;
   (c) said crimps of said streamer tape strip forming a series of alternating, opposite-facing, permanent bends therein; and
   (d) said reinforcing tape strip being applied to said streamer tape strip so as to adhere and conform to the configuration of said bends thereof formed by said crimps.

2. The streamer of claim 1 wherein said reinforcing tape strip is applied generally perpendicular to the longitudinal extent of said crimps in said streamer material strip.

3. The streamer of claim 1 wherein said reinforcing tape strip is centered between a pair of opposite side edges of said streamer tape strip.

4. The streamer of claim 1 wherein said crimps of said streamer tape strip provide a multiplicity of transversely-extending opposing pairs of surfaces with the surfaces of one pair being disposed in inclined relation to the surfaces of each adjacent pair.

5. The streamer of claim 4 wherein said reinforcing tape strip is applied to said streamer tape strip so as to adhere to said surfaces of said pairs thereof on said one face of said streamer material strip.

6. The streamer of claim 1 wherein said reinforcing tape strip is flexible reinforced strapping tape strip.

7. The streamer of claim 1 wherein said reinforcing tape strip is a flexible transparent mending tape strip.

8. The streamer of claim 1 wherein said reinforcing tape strip is a flexible opaque masking tape strip.

9. The streamer of claim 1 further comprising a pair of said reinforcing tape strips being applied to said one face of said streamer material strip in longitudinally extending, spaced apart side-by-side relation to one another.

10. The streamer of claim 1 wherein the width of said reinforcing tape strip is less than one-fifth of the width of said streamer material strip.

11. A longitudinally-reinforced, crimped streamer, comprising:
(a) a thin narrow streamer tape strip of flexible metal or metallized plastic streamer tape strip having a first end and a second end, a pair of opposite faces and a multiplicity of longitudinally-spaced, transversely-extending crimps set therein so as to form a series of alternating, opposite-facing, permanent, flexible bends therein and provide a multiplicity of transversely-extending opposing pairs of surfaces with the surfaces of one pair being disposed in inclined relation to the surfaces of each adjacent pair whereby said streamer tape strip is flexible and twistable along a longitudinal axis to form a spiral; and
(b) at least one elongated strip of flexible reinforcing tape strip much narrower in width than said strip of streamer tape strip and adhesively applied to said adjacent surfaces on one face thereof and extending longitudinally therealong between said ends.

12. The streamer of claim 11 wherein the width of said reinforcing tape strip is less than one-fifth of the width of said streamer tape strip.

13. The streamer of claim 11 wherein said reinforcing tape strip is applied generally perpendicular to the longitudinal extent of said crimps in said streamer tape strip.

14. The streamer of claim 11 wherein said reinforcing tape strip is centered between a pair of opposite side edges of said streamer tape strip.

15. The streamer of claim 11 wherein said reinforcing tape strip is applied to said streamer tape strip so as to adhere to and follow the configuration of said bends thereof formed by said crimps.

16. The streamer of claim 11 wherein said reinforcing tape strip is reinforced strapping tape.

17. The streamer of claim 11 wherein said reinforcing tape strip is a transparent mending tape strip.

18. The streamer of claim 11 wherein said reinforcing tape strip is an opaque masking tape strip.

19. The streamer of claim 11 further comprising a pair of said reinforcing tape strips being applied to said one face of said streamer tape strip in longitudinally extending, spaced apart side-by-side relation to one another.

20. The streamer of claim 11 wherein said streamer and reinforcing tape strips are bent back on themselves at respective end margins thereof adhered to one another, said bent back end margins having a hole formed therethrough.

21. The streamer of claim 20 further comprising a flexible cord 28 being inserted through said hole and attached to said double-backed tape strip end margins.

* * * * *